United States Patent [19]
Ferneau et al.

[11] 3,980,334
[45] Sept. 14, 1976

[54] ALL LEVEL CART WITH SWIVEL CASTERS

[75] Inventors: Richard H. Ferneau, Washington Court House; Burt Weil, Cincinnati, both of Ohio

[73] Assignee: Burt Weil, Cincinnati, Ohio

[22] Filed: Jan. 31, 1975

[21] Appl. No.: 545,969

[52] U.S. Cl. .................................. 296/20; 5/86; 280/43.17; 280/763
[51] Int. Cl.[2] ............................................ A61G 1/02
[58] Field of Search ........ 296/20; 280/150.5, 43.17, 280/43, 47; 5/86

[56] References Cited
UNITED STATES PATENTS

| | | | |
|---|---|---|---|
| 2,255,462 | 9/1941 | Cowles | 5/86 X |
| 2,877,048 | 3/1959 | Weil | 296/20 |
| 3,057,655 | 10/1962 | Weil et al. | 296/20 |
| 3,644,944 | 2/1972 | Bourgraf | 5/86 |
| 3,826,528 | 7/1974 | East | 296/20 |

*Primary Examiner*—L. J. Paperner
*Assistant Examiner*—Donald W. Underwood
*Attorney, Agent, or Firm*—Wood, Herron & Evans

[57] ABSTRACT

An ambulance cart having a bed from which four legs depend. The legs are adapted to swing away from each other to lower the level of the cart. An extensible frame is mounted at the lower ends of the legs, and casters adapted to swivel about vertical axes are attached to the frame so that as the legs are spread apart the frame enables the casters to maintain the vertical orientation of their swivel axes. Both forward and rearward legs are also adapted to swing rearwardly to enable the cart to be thrust into a vehicle.

13 Claims, 18 Drawing Figures

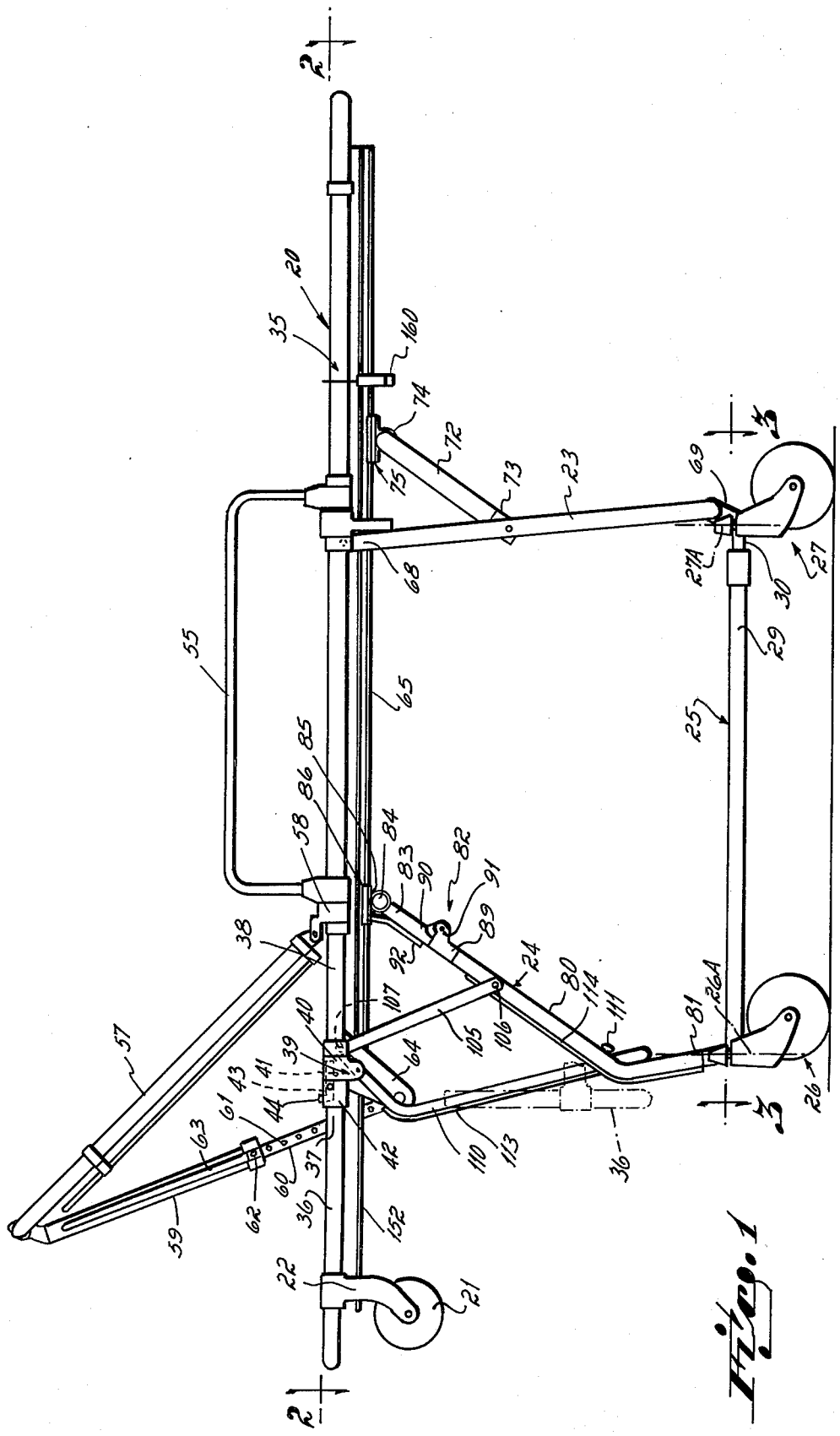

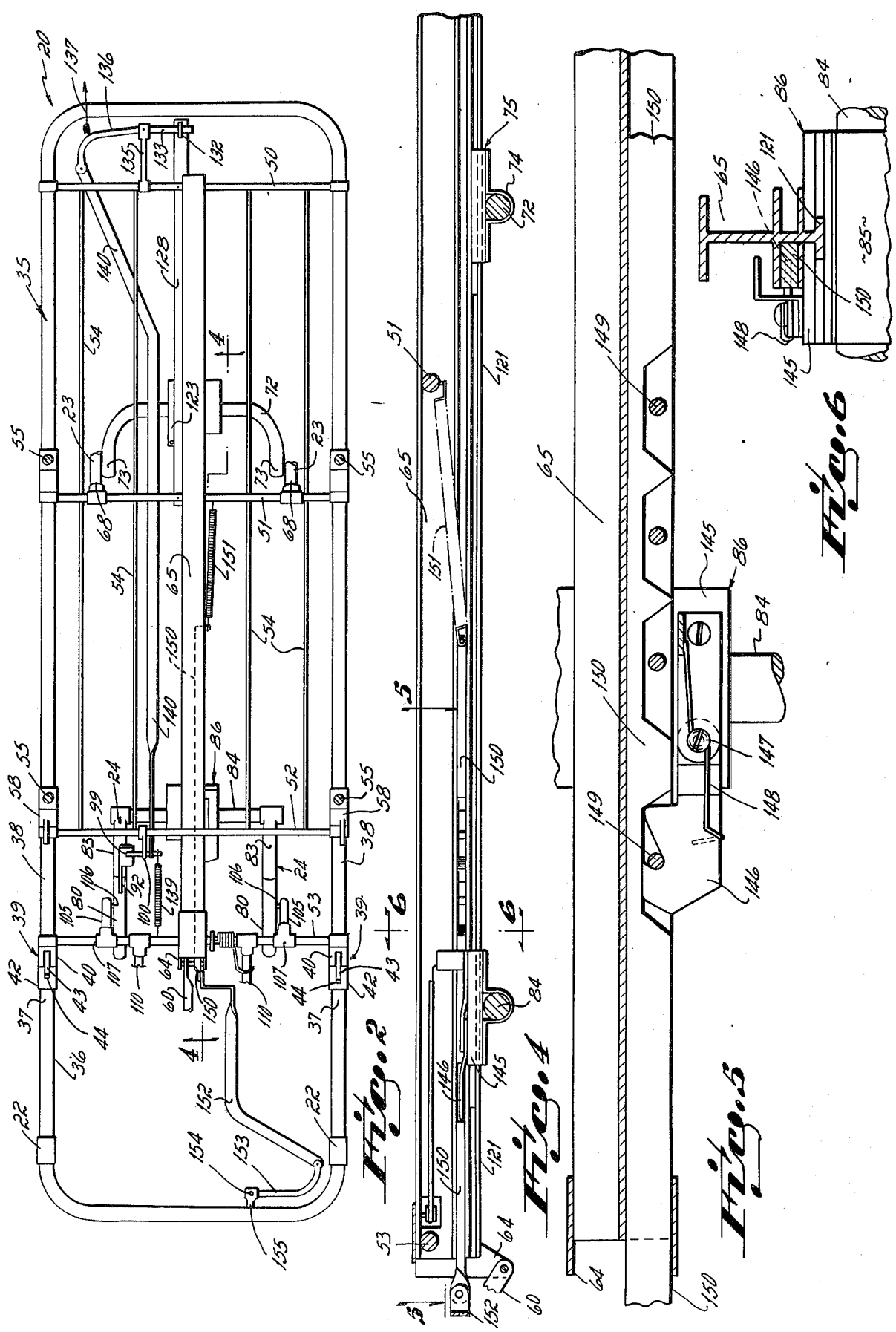

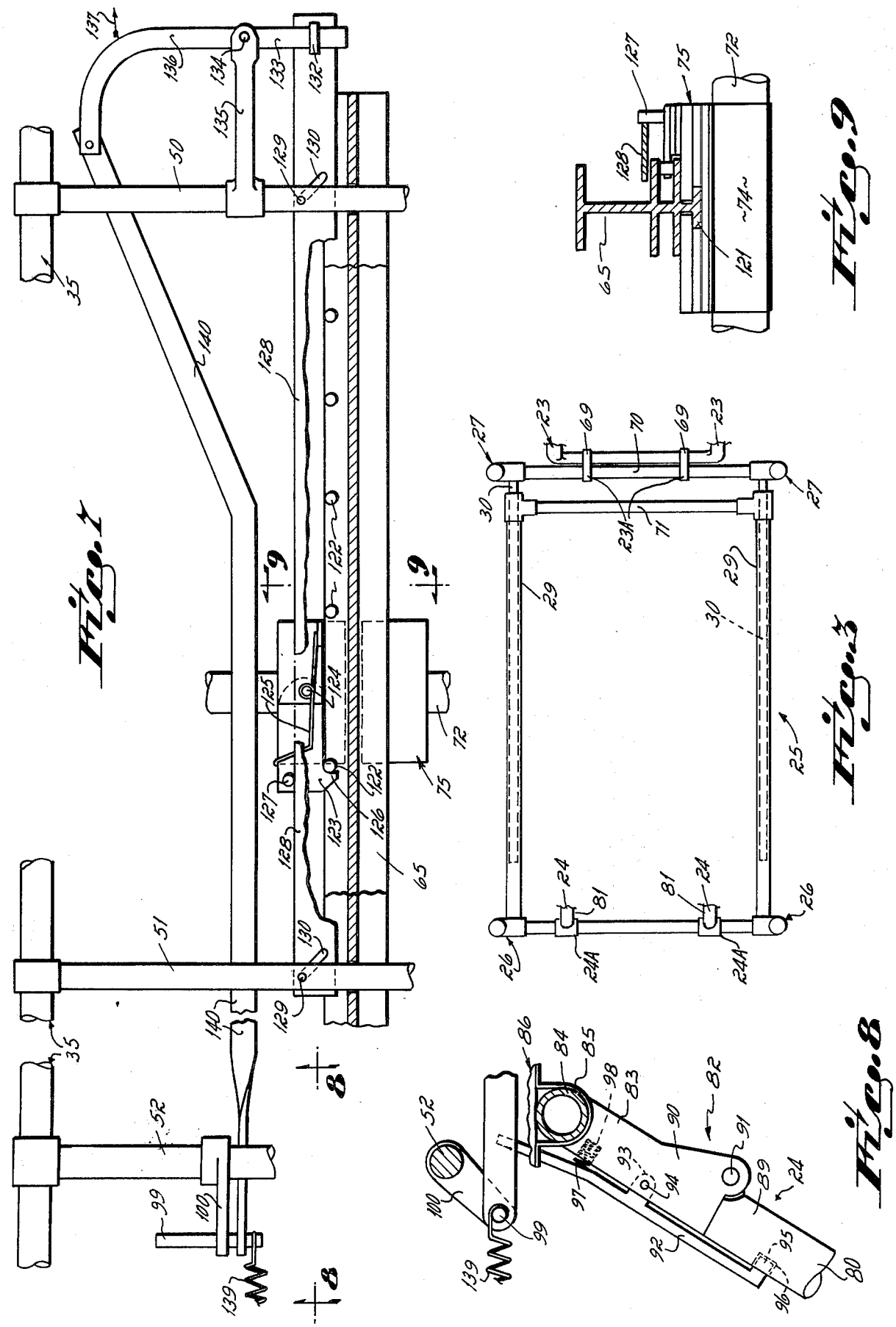

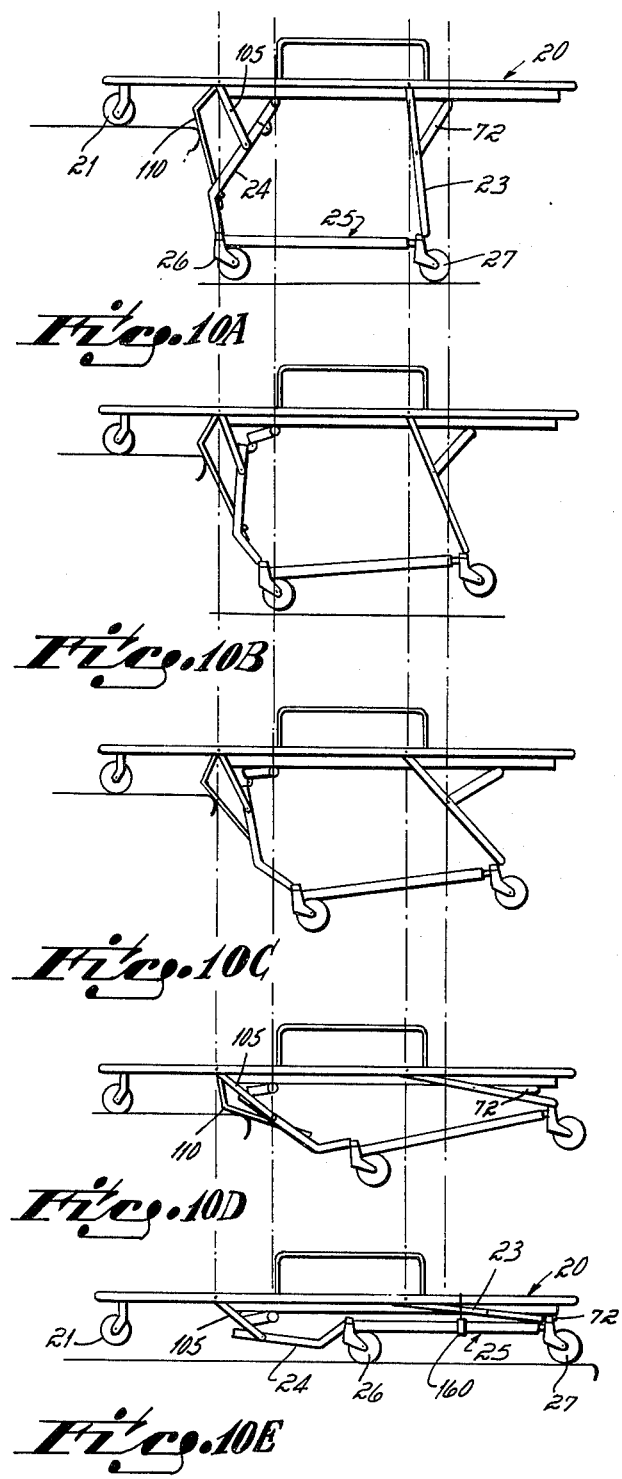
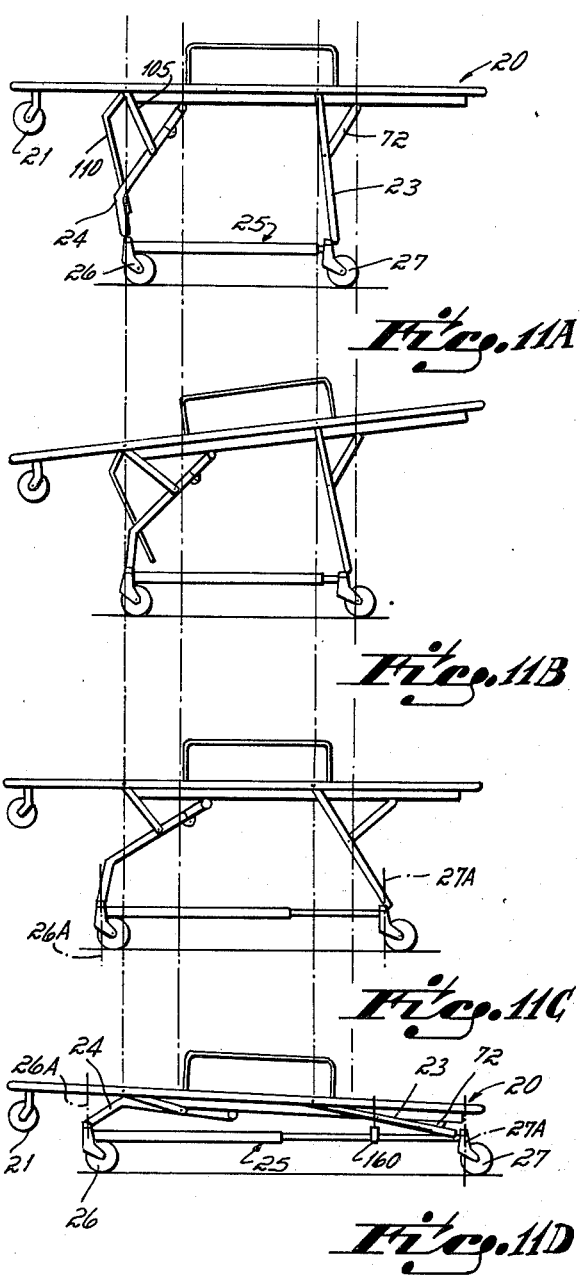

ALL LEVEL CART WITH SWIVEL CASTERS

This invention relates to a cart, and more particularly, the invention relates to a cart having four depending legs which are swingable rearwardly to be adapted to be thrust into a vehicle and which are also swingable apart from each other in order to lower the level of the cart.

A cart of this type is disclosed in the patent of Donald East, U.S. Pat. No. 3,826,528, granted July 30, 1974, and are adapted for ambulance and mortuary work and are useful in conveying heavy articles.

The cart of the present invention constitutes an improvement upon the cart of U.S. Pat. No. 3,826,528 in several respects, as will be developed below. Primarily, however, the present invention is addressed to a solution of the problem of proper operation of swivel casters in an all level cart.

By way of background, a first series of inventions was made by Weil for one man ambulance or mortuary carts, that is, carts having a bed, auxiliary wheels at the forward end of the bed and four depending legs which are adapted to swing rearwardly to enable the cart to be thrust into a vehicle by a single operator standing at the rear of the cart, the cart being rolled into the vehicle on the forward auxiliary wheels as the legs swing rearwardly upwardly.

It has been desired for some time to improve upon that basic concept by providing for the adjustment of the bed of the cart to various levels without altering the capability of the cart to be thrust into a vehicle by rolling it on the auxiliary wheels accompanied by the rearward swinging of the legs. This feature is desired in order to accommodate the cart to various conditions of operation, particularly those involving the transfer of bodies between the cart and beds of various levels or the ground level. Obviously, the transfer of a body is greatly eased if the cart and bed are at the same level.

The most recent improvement in the all level cart is embodied in the East patent. There, generally vertical legs are pivotally mounted to the bed of the cart. They are swingable rearwardly for loading the cart into a vehicle. The forward and rearward legs are adapted to swing outward and away from each other through sliding and pivotal connections of the legs and braces to the bed in order to vary the level of the cart. In the swinging of the legs to change the level of the cart, the angle of the legs with respect to the bed of the cart is necessarily altered and in altering that angle, the swivel axes of the casters is changed from a vertical orientation to an angulated orientation. The angulated swivel caster does not swivel properly in order to permit the cart to be steered. In a cart having four swivel casters with the weight of a body on it, the swivel casters assume a fore and aft orientation which is next to impossible to change because the supported weight holds the casters in that orientation. As a consequence, such a cart is extremely difficult to manage and to steer.

East describes a solution of the problem which includes the mounting of the casters on a parallelogram linkage. That solution, while functionally satisfactory, adds considerably to the cost of manufacturing, particularly where four castered wheels are required.

The all level East cart, without provision for swivel casters, is principally satisfactory for mortuary work wherein the body is strapped to the cart. The cart can be lifted to operate on two wheels or can be upended and rolled on the auxiliary wheels, for in mortuary work there is not the trauma which would be involved in that type of handling of a live patient.

It has been an objective of the present invention to provide an all level cart having legs which are swingable apart to vary the level of the cart, provision being made for the mounting of swivel casters to maintain their swivel axes vertical regardless of the position of the legs. The objective is achieved primarily in mounting an extensible horizontal frame on the lower ends of the legs and securing the swivel casters to the extensible frame. Thus, as the legs are swung outwardly to lower the level of the cart, the frame extends. The angle of the legs changes with respect to the frame through a pivotal connection with the frame, but the vertical orientation of the swivel casters which are secured to the frame is not changed.

In the East cart the forward legs and the braces therefor were both slidably mounted, and the braces for the rearward legs were slidably mounted in order to accommodate the different types of swinging movements required in the operation of the cart. In that construction the rearward swinging of the legs brought the lower ends of the legs quite close together as the cart was collapsed. When the cart was shifted to all level position, however, the legs were spread quite far apart. To apply an extensible frame to the legs of the East cart would be quite difficult in view of the considerable difference between their maximum spacing and minimum spacing.

The present invention contemplates a modification in the leg mounting structure wherein the forward legs are both slidably mounted and hinged to the bed of the cart, the slidable mounting being provided for the spreading apart, all level, operation and the hinge mounting being provided for the rearward swinging of the legs to introduce the cart into a vehicle.

The elimination of the slide for the brace on the forward legs has an additional advantage of shortening the length of the beam to which the slide was attached and thereby to permit the forward end of the bed to be lockably hinged and to swing downwardly, thereby shortening the length of the cart. The shorter cart length greatly facilitates the moving of a patient around tight corners and into small elevators and the like.

Another objective of the invention has been to improve the slidable mounting of the legs and braces to the bed of the cart for a smoother, more noiseless operation. To this end, the invention provides a slide mounted on a beam extending longitudinally of the cart, the slide carrying a pivoted latch which cooperates with pins on the beam. The latch is operated by a longitudinal cam bar which is moved transversely away from the beam and is engageable with the latch to hold the latch out of contact with the pins as the slide travels along the beam, thus eliminating the clacking of the latch against the pins during a change of the level of the cart.

Another objective of the invention has been to improve the mounting and shape of the legs, particularly the forward legs of the cart, to add to the ease with which the cart may be thrust into a vehicle. In accordance with the present invention, the forward legs are hinged to the bed at a point spaced slightly downwardly from the level of the bed. Further, the lower portion of the forward legs is angulated rearwardly to minimize the possibility of the casters catching on the vehicle as the cart is thrust into the vehicle. Still further, a bail is pivoted to the bed forward of the forward legs and is engageable with the forward legs to provide better leverage in in the initial rearward swinging movement of the legs as the cart is thrust into the vehicle.

The hinge on the forward legs has a latch which is operable from a handle at the rear of the cart. The handle at the rear of the cart normally can only operate the latch when the weight of the cart at its forward end is shifted from the forward legs to the auxiliary wheels as when the auxiliary wheels rest on the platform of the vehicle into which the cart is to be thrust. Thus, the latch on the forward legs is only operable in conditions in which the forward end of the cart is supported be the vehicle.

The several objectives and features of the invention will become more readily apparent from the following detailed description taken in conjunction with the drawings in which:

FIG. 1 is a side elevational view of the cart;

FIG. 2 is a top plan view partly in section, taken along line 2—2 of FIG. 1;

FIG. 3 is a cross-sectional view taken along line 3—3 of FIG. 1;

FIG. 4 is a cross-sectional view taken along line 4—4 of FIG. 2;

FIG. 5 is a cross-sectional view, taken along line 5—5 of FIG. 4;

FIG. 6 is a cross-sectional view taken along line 6—6 of FIG. 4;

FIG. 7 is an enlarged portion of FIG. 2 illustrating a latch mechanism;

FIG. 8 is a cross-sectional view, taken along line 8—8 of FIG. 7;

FIG. 9 is a cross-sectional view, taken along line 9—9 of FIG. 7;

FIGS. 10 A-E are diagrammatic views showing a cart thrust into a vehicle;

FIGS. 11 A-D are diagrammatic views showing a changing of the level of the cart.

Referring principally to FIGS. 1 and 2, the cart comprises a generally horizontal bed 20, a pair of auxiliary wheels 21 secured by brackets 22 to the bed 20 and having two rearward depending legs 23 and two forward depending legs 24. A rectangular frame 25 (see FIG. 3 also) is pivoted to the lower ends of the legs 23 and 24, at 23A and 24A, respectively. A pair of swivel casters 26 are secured on vertical axes 26A to the forward end of the frame and a pair of swivel casters 27 are secured on vertical axes 27A to the rearward end of the frame. The frame 25 is formed in part by longitudinally extending telescoping tubes 29 and 30 which enables the frame to be longitudinally extensible.

The bed 20 includes a rectangular frame 35, the forward end of which 36 is a U-shaped member whose rearward ends 37 are hinged to the remainder of the frame 38 by a hinge 39. The hinge 39 includes a fixed member 40 containing a transverse hinge pin 41 and a movable member 42 having a spring biased hook latch 43 operable by a button 44 to unlatch it against the urging of the spring. When the hinge is unlatched, the U-shaped forward section 36 of the frame 35 is adapted to swing through an angle of approximately 90° to the position shown in phantom lines in FIG. 1, thereby shortening the overall length of the cart.

The frame 35 also includes four transverse rods 50, 51, 52, 53. The rods 50–52 support longitudinal rods 54 which support a mattress.

Conventional guard rails 55 are pivoted to each side of the frame 35 and are adapted to be swung to a downward position for patient transfer to and from the bed or locked in an upper position to secure the patient on the bed.

A backrest 57 is pivotally secured to the frame 35 by brackets 58 on each side of the frame, the backrest being adjustably supported for different angular positions with respect to the frame by a pair of telescoping tubes 59 and 60. Tube 60 has a series of transverse holes 61 which are adapted to cooperate with a pin 62 operable by a lever 63 pivotally mounted on the tube 59 to fix the tubes in various positions of extension to adjust the angular position of the backrest. The lower end of the tube 60 is pivotally connected to a downwardly depending bracket 64.

A longitudinally extending beam 65 is mounted on the transverse rods 50, 51 and 53. The depending bracket 64 is fixed to the forward end of the beam 65.

The rearward legs 23 are pivoted at their upper ends 68 to the transverse rod 51. The rearward legs are formed of a U-shaped tube which at its lower end is pivotally fixed to the two brackets 69, the bracket 69 in turn being pivotally secured at 23A to a transverse rod 70 (FIG. 3) which is fixed at its ends to the telescoping tubes 30.

A transverse rod 71 braces the adjacent ends of the telescoping tubes 29 of the frame 25. A U-shaped brace 72 is pivotally secured at its ends 73 to the legs 23 and the bight portion of the brace 72 is pivotally secured by a bracket 74 to a slide 75 slidably mounted on the beam 65. The slide 75 is lockable in any one of a plurality of positions, as will be described below.

Each of the forward legs 24 has a lower section 80, the lower portion of which 81 is angulated to assist in raising the casters up out of the way of a vehicle platform as the cart is thrust into the vehicle as is shown in FIGS. 10 A-E. The upper end of each section 80 is connected by a hinge 82 to an upper section 83 of the forward legs (see also FIG. 8). The upper end of the upper section 83 is secured to a transverse tube 84, the transverse tube 84 being pivoted by means of a bracket 85 to a forward slide 86, the forward slide being slidably and adjustably mounted on the beam 65.

Each hinge 82 is formed by a lower member 89 fixed to the lower section 80 and an upper member 90 integral with the upper section 83, the two members being connected by a hinge pin 91. One of the hinges has a lock consisting of an elongated bar 92 having a central lug 93 pinned at 94 to the upper hinge member 90 for pivotal movement. The lower extremity of the bar 92 has a lug 95 insertable into a hole 96 in lower hinge member 89 to lock the hinges against breaking. A compression spring 97 is secured in a hole 98 in upper hinge member 90 and bears against the upper end of the bar 92 to urge the bar into a locking condition. The hinge is unlocked by the engagement of it by a pin 99 (FIGS. 7 and 8) projecting laterally from a bracket 100 which is pivoted on the transverse rod 52 and operated in a manner to be described below.

The forward legs 24 are braced on each side by a diagonal brace 105 (FIG. 1) pivoted at 106 to the lower section 80 of the forward legs and pivoted at 107 to the transverse rod 53. A U-shaped bail 110 is also pivoted at its upper end to the rod 53 and is engageable at its lower end against a transverse rod 111 fixed to the lower section of the forward legs 24. The forward surface of the bail 110 as well as the forward surface of the legs 24 are covered with nylon strips 113 and 114 to provide anti-friction skids to facilitate the introduction of the cart into a vehicle.

The slide 75 for the brace 72 and the slide 85 for the forward legs 24 may be of the type described in the East patent or may be of the modified type described below with reference to FIGS. 7 and 9. A modified slide 75 secured to the brace 74 at the rearward end of the cart includes a plate slidably secured to a lower flange 121 of the beam 65. A series of spaced pins or abutments 122 are secured to the beam and are engageable by a latch 123 which is pivoted on a pin 124 which is fixed to the slide 75. A spring 125 normally urges the latch in a counterclockwise direction, as viewed in FIG. 7, into latching condition with respect to the pins 122. The latch has an abutment 126 engageable with the pins 122. A cam pin 127 projects vertically from the latch and is engageable by a cam bar 128 which is mounted on the transverse rods 50 and 51 by pins 129, the pins passing through angulated slots 130 in the bar 128. The cam bar 128 has a loose fitting connection by means of a bracket 132 to an operating handle 133 pivoted at 134 to a bracket 135 fixed to the rod 50. When the handle 133 is gripped at 136 and pulled rearwardly in the direction of the arrow 137, the bar is thrust longitudinally toward the left, as viewed in FIGS. 2 and 7. As it moves toward the left, the angulated slots 130 cooperating with the pins 129 cause the cam bar to be moved transversely away from the beam 65. The transverse movement of the bar away from the beam causes the latch, through its pin 127, to swing in a clockwise direction to an unlatching position to permit the slide 75 to move freely with respect to the beam. In this way, the rearward legs are adapted to be freed to swing rearwardly but are also capable of being latched in any one of a number of angulated positions to change the level of the cart, as will be explained below.

The handle 133 is connected through an elongated strap 140 to the bracket or operator 110 which, as explained above, unlocks the hinge on the forward legs 24. A tension spring 139 secured between the forward end of the strap 140 and the transverse rod 53 urges the strap in a leftward direction, as viewed in FIGS. 2 and 7, which in turn urges the cam bar 128 and the pin 99 to positions in which the latch for slide 75 and the lock bar 92 for the forward leg hinge are in a latched and locked condition respectively. Normally the spacing between the pin 99 and the lock bar 92 is sufficiently great that the pulling of the handle 133 to its full extent will not effect engagement of the pin 99 with the hinge lock bar 92. However, when the weight at the forward end of the cart is removed, as by rolling the auxiliary wheels onto the platform of a vehicle, the upper ends of the forward legs 24 will slide slightly forwardly to close the distance between the lock bar 92 and the pin 99, thereby bringing it into a position to be unlocked by the handle 133. The one operation of the handle 133 will cause the delatching of the slide 75 on the brace for the rear legs and simultaneously the unlocking of the hinge 82 for the forward legs so that the cart can be thrust into a vehicle by an attendant standing at the rear of the cart. That operation, however, cannot occur unless the forward end of the cart is supported.

In the illustrated form of the invention (FIGS. 4, 5, and 6), the slide 86 at the upper end of the forward legs 24 is of the type described in the East patent. There, a slide plate 145 is slidably mounted on the flange 121 of the beam 65. The plate carries a latch 146 which is pivoted to the plate by a pin 147, the latch being urged by a spring 148 to a latched condition with respect to a series of vertical pins 149 mounted on the beam 65. A serrated cam bar 150 is slidable on the beam 65 and is urged by a tension spring 151 connected between the bar and transverse rod 51 to a latched position. The serrated cam bar has teeth which, in the latched position of the bar, free the pins for engagement by the latch 146. In the unlatched position, however, one of the inclined surfaces of the cam bar teeth engages the latch, forcing it away from the pins and blocks access of the latch to the pins, thereby permitting the slide to slide past the pins. As the latch slides past the pins, it produces a clicking sound which the latch and cam bar combination described above for the slide 75 avoids.

The cam bar 150 is secured at its forward end to a strap 152 (FIG. 2) which is in turn connected to a handle 153 pivoted at 154 to a bracket 155 at the forward end of the frame 35.

It will be recalled that the forward end of the frame is adapted to be swung from the horizontal attitude to a downwardly depending vertical position. To permit the strap 152 to accommodate the downward swinging of the forward end of the frame, the strap is pivoted to the cam bar on approximately the same axis as the hinges 39 at the forward end of the frame.

By grasping the handle 153 and pivoting it clockwise, as viewed in FIG. 2, the cam bar 150 is drawn toward the left, camming latch 16 out of engagement with its pin 149. The slide 86 is thereby free to slide to permit a change in the angular position of the leg and hence a change in the level of the cart.

In the operation of the invention, the cart in its fully raised position, as shown in FIG. 11A, is wheeled to the bed of a patient, for example. A single attendant standing at the forward end of the cart grasps the handle 153 to move the cam bar 150 in a forward direction, thereby delatching the slide at the upper end of the forward legs 24. The forward end of the cart can then be lowered to the height of the bed on which the patient lies (FIG. 11B).

By grasping the handle 133 at the rear end of the cart, the cam bar 128 is moved transversely to delatch the slide 75 and permit the rearward end of the cart to be lowered to the same level as the forward end of the cart (FIG. 11C). As shown in FIGS. 11B and 11C, the lowering of the bed is caused by the outward swinging of the forward and rearward legs with respect to each other. In swinging outwardly, the telescoping frame extends by means of the sliding engagement of the telescoping tubes 29 and 30. As the legs swing outwardly and the frame extends, the swivel axes 26A and 27A of the castered wheels nevertheless remain in their vertical orientation.

After the patient is transferred to the cart, the cart can very easily be rolled and steered to an ambulance or other vehicle where it will be thrust into the vehicle in the manner described below.

It should be further observed by reference to FIGS. 11B, 11C and 11D that the cart can be lowered almost completely to ground level by means of the operation described above so as to facilitate the transfer of a patient lying on the ground to the cart. When a patient is placed on a cart and the cart is in its lowermost position, a single attendant would raise the cart to a level for transporting a patient in stages by raising first one end slightly and then the other and returning to the first end until the patient could be fully raised without causing too great an angle to the horizontal attitude of the bed. More often, however, in ambulance work two attendants pick up a patient. When two attendants work together, both ends can be raised and lowered simultaneously.

In thrusting the cart into a vehicle (FIGS. 10A-E), the bed is raised to its maximum height. The forward end of the cart is rolled into the vehicle with the auxiliary wheels 21 engaging the platform of the vehicle. When the weight of the forward end of the cart is supported on the vehicle, the upper ends of the forward legs will be caused by gravity by swing forward to bring the hinge lock bar 92 into an operative position with respect to the operator pin 99. In this position the handle 133 at the rear of the bed is pivoted and simultaneously unlocks the hinge lock and delatches the slide 75. Both forward and rearward legs are thus in a condition to swing rearwardly. The attendant, holding the handle in an unlocking and delatching position, thrusts the cart in a forward direction and in one continuous motion causes the legs of the cart to swing rearwardly and the cart to be thrust in the vehicle. In the first stage of this operation, the rear edge of the vehicle engages the bail 110 causing it to swing rearwardly and bear against the rod 111, forcing the lower section 80 of the forward legs 24 to begin to swing rearwardly about the hinge pins 91. Continued thrust swings the forward legs 24 rearwardly with the forward nylon-lined surfaces 114 of the legs engaging the rear of the vehicle and ultimately the platform on which they slide. The rearward swinging of the forward legs causes, through the now contracted frame 25, the simultaneous rearward swinging of the rearward legs. The rearward swinging of the rearward legs is permitted by the sliding movement of the upper end of the brace 72 with respect to the beam 65. As the cart is thrust into the vehicle, the angulated lower portion of the forward legs 24 projects in an upwardly inclined direction and assists in keeping the swivel casters clear of the vehicle structure so that the cart may have an unimpeded movement into the vehicle. FIG. 10E shows the cart in collapsed condition after it has been thrust into the vehicle.

A hook 160 secured to the bed may be used to hook the telescoping frame so as to keep the cart in a collapsed position in the event that it is desired to have the patient carried on the cart by attendants using the cart in the form of a stretcher.

In removing the cart from the vehicle, the reverse procedure is followed. As the legs become free of the vehicle platform, they swing downwardly to their vertical attitude and automatically lock in the upright position. In this attitude the cart is ready to be rolled to its destination.

We claim:

1. A cart comprising,
a generally horizontal bed,
four legs depending generally vertically from said bed,
diagonal braces connected between said legs and said bed,
a horizontal frame mounted on the lower ends of said legs and adapted to be elongated and shortened in one direction,
four wheels mounted on said frame,
at least two of said wheels being mounted on vertical swivel axes,
one of said braces being pivotally connected to said bed, and the other having a sliding connection to said bed,
means for adjustably varying said sliding connection to vary the level of said bed,
whereby said bed may be lowered without altering the vertical orientation of said swivel axes.

2. A cart as in claim 1 in which all of said four wheels are mounted to said frame on vertical swivel axes.

3. A cart as in claim 1 in which said frame includes two longitudinally extending telescoping tubes on each side of said cart.

4. A cart comprising,
a generally horizontal bed having auxiliary wheels on the forward end thereof,
four legs depending from said bed, two of said legs being rearward legs and two of said legs being forward legs,
a horizontal frame mounted on the lower ends of said legs and adapted to be elongated and shortened in a longitudinal direction,
four wheels on said frame, at least two of said wheels being mounted on swivel casters,
means permitting said legs and frame to swing rearwardly,
and means permitting said forward and rearward legs to swing apart while elongating said frame to lower the level of said bed.

5. A cart as in claim 4 further comprising,
means bracing the forward and rearward legs of said cart,
means operable from each end of said cart to release said bracing means to permit said legs to swing.

6. A cart as in claim 5,
said forward legs having separate release means for permitting rearward and forward swinging of said forward legs.

7. A cart as in claim 4,
the rearward legs being pivoted to said bed and having a diagonal brace pivoted to said legs and slidably mounted on said bed,
a releasable hinge connecting the forward legs to said bed, said hinge being slidable with respect to said bed,
said forward legs swinging rearwardly about said hinge and swinging forwardly through the sliding of said legs with respect to said bed.

8. A cart as in claim 7 further comprising,
a latch for locking said hinge on said forward legs,
means operable to release said latch from the rear of said cart, said release means being operable only when the forward end of said cart is supported as by resting the auxiliary wheels on the platform of a vehicle.

9. A cart comprising,
a generally horizontal bed having auxiliary wheels on the forward end thereof,
a pair of rearward legs pivoted to said bed,
a diagonal brace for said rearward legs pivoted at its lower end to said legs and slidably mounted at its upper end to said bed,
a pair of forward legs, a hinge attaching each of said forward legs to said bed, each said hinge containing an upper portion connected to the bed and a lower portion connected to its respective front leg the upper portion of said hinge being slidable with respect to said bed, a diagonal brace pivoted to said bed and said forward legs, an extensible frame interconnecting the lower ends of said legs, swivel casters mounted on said frame, releasable means associated with said hinge snd slidable connections to selectively permit said legs to swing rearwardly to introduce said cart into a vehicle, and to swing outwardly to vary the level of said bed.

10. A cart according to claim 9 in which said releasable means includes, a lock movably mounted on said hinge and normally locking said hinge portions together to block rearward swinging movement of said legs, an operator engageable with said lock to release said lock, and a handle at the rear of said cart and connected to said operator to operate said operator.

11. A cart according to claim 10, said lock normally being inaccessible to said operator, said hinge being slidable into position for engagement by said operator upon raising of the forward end of said bed, whereby said lock is normally only releasable when the auxiliary wheels of said cart are supported on a vehicle platform.

12. A cart according to claim 9 further comprising, a bail pivoted to said bed forward of said front legs, said bail extending downwardly and into engagement with said front legs, said bail being engageable by the rear portion of a vehicle to provide initial thrust to said legs to effect rearward swinging of said legs as said cart is pushed into a vehicle.

13. In a cart having slidable legs or braces attached to a bed, a sliding latch therefor comprising, an elongated bar, a slide mounted on said bar, a series of spaced abutments on said bar, a latch pivoted on said slide and engageable with said abutments, an elongated cam mounted adjacent said bar for transverse movement, said cam having at least one angulated slot, a pin on said bed received in said slot whereby longitudinal movement of said cam will cause said cam to move transversely with respect to said bar, said cam being engageable with said latch, said cam being transversely movable away from said bar to cam said latch away from said spaced abutments.

* * * * *